J. LICHY.
HAY RACK.
APPLICATION FILED MAR. 13, 1917.
1,255,899.
Patented Feb. 12, 1918.
2 SHEETS—SHEET 2.
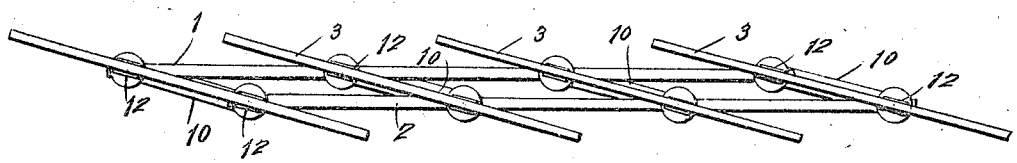
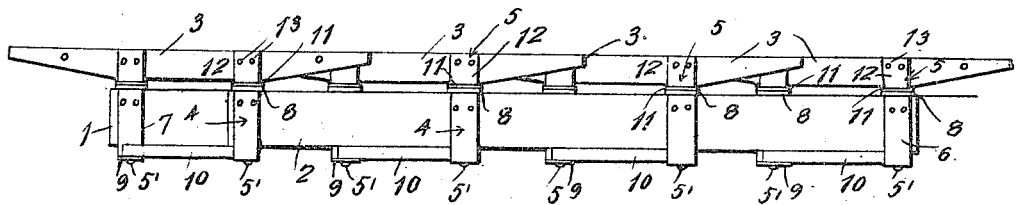
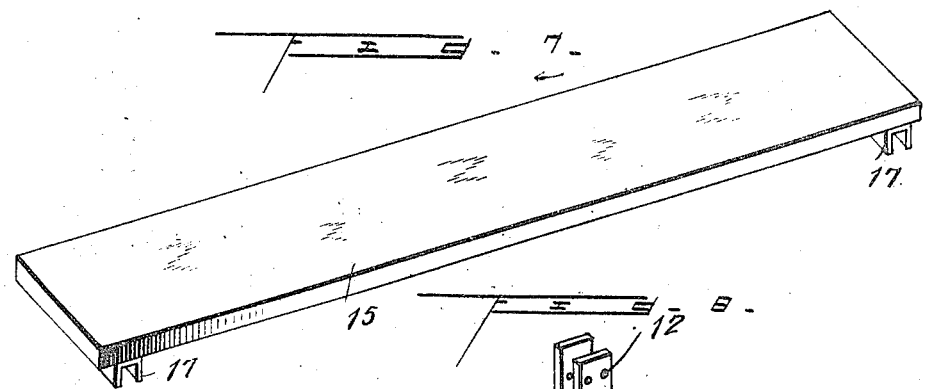
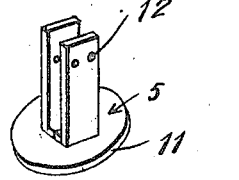
Witness
E. A. Stanton
Robt Meyer
Inventor
J. Lichy.
By
Attorney

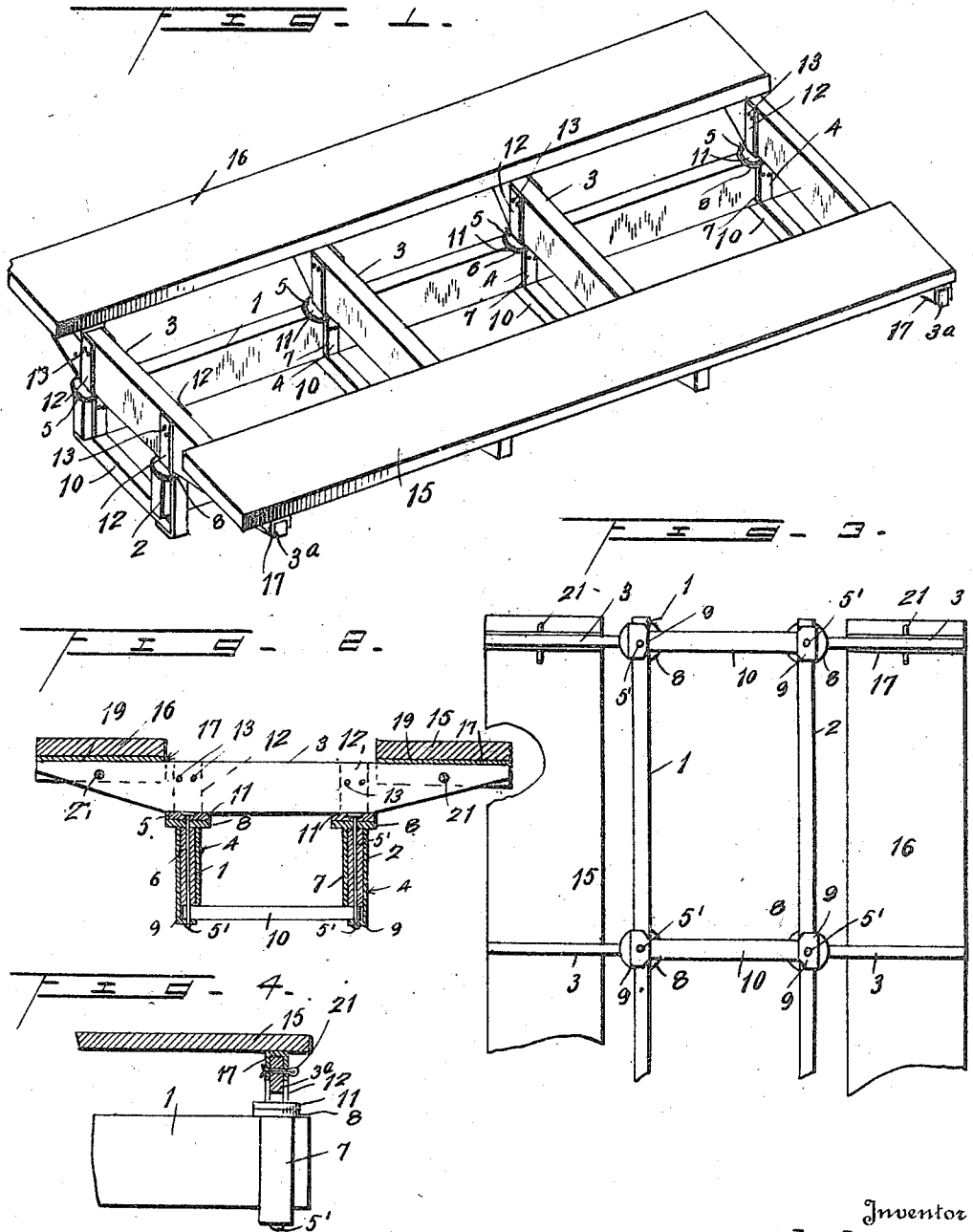

UNITED STATES PATENT OFFICE.

JOSEPH LICHY, OF AVON, MINNESOTA.

HAY-RACK.

1,255,899.

Specification of Letters Patent. Patented Feb. 12, 1918.

Application filed March 13, 1917. Serial No. 154,497.

*To all whom it may concern:*

Be it known that I, JOSEPH LICHY, a citizen of the United States, residing at Avon, in the county of Stearns and State of Minnesota, have invented certain new and useful Improvements in Hay-Racks; and I do hereby declare the following to be a full, clear, and exact description of the invention, such as will enable others skilled in the art to which it appertains to make and use the same.

This invention relates to hay racks, and the primary object of the invention is to provide a hay rack which includes the usual type of rails to which a plurality of cross trees are pivotally connected, which cross trees support, at their outer ends, the side boards of the hay rack which side boards are detachably connected to the trees so that when it is desired, the side boards may be removed from the trees and the rack collapsed, by moving the rails toward each other so that the hay rack will occupy a compact space for storing, and so that it may be collapsed into a compact form for facilitating its mounting upon or removal from the running gears of a wagon.

With the foregoing and other objects in view, this invention consists in such novel features of construction, combination and arrangement of parts as will be hereinafter more fully described, illustrated in the accompanying drawings and claimed.

In describing the invention in detail, reference will be had to the accompanying drawings wherein like characters designate like and corresponding parts throughout the several views, and in which:—

Figure 1 is a perspective view of the improved hay ladder;

Fig. 2 is a cross sectional view through the hay ladder showing the manner of connecting the cross trees to the rails of the ladder and also illustrating in section the manner of connecting the side boards to the ends of the cross trees;

Fig. 3 is a fragmentary bottom plan of the hay rack;

Fig. 4 is a fragmentary section taken at right angles to the section illustrated in Fig. 2, and illustrating the manner of connecting the ends of the side boards to the end cross tree;

Fig. 5 is a top plan view of a hay rack in a collapsed position;

Fig. 6 is a side elevation of a hay rack in a collapsed position;

Fig. 7 is a perspective view of one of the side boards; and

Fig. 8 is a detail perspective view of a part of the coupling member employed for pivotally connecting the cross trees to the rails of a rack.

Referring more particularly to the drawings, 1 and 2 indicate the rails of the hay rack which extend longitudinally thereof, as is ordinary in the construction of hay racks or ladders. The rails 1 and 2 have a plurality of cross trees or arms 3 pivotally connected thereto through the medium of coupling members 4 and 5 and pivot pins 5'.

The coupling members 4 are secured to the rails 1 and 2 and they comprise a pair of vertical parallel extending base plates 6 and 7 which have their upper ends connected to a circular disk 8 that rests upon the upper edge of the rails. The plate 6 has its lower end angled as shown at 9 and secured through the medium of the pivot pins 5' to the end of a cross brace 10 which cross brace extends from one of the rails to the other as clearly shown in Fig. 2 of the drawings, for bracing the rails and holding their lower edges in the proper spaced relation.

The coupling members 5, which are carried by the cross trees or arms 3 comprise circular disks or plates 11 which rest upon the upper surface of the disk 8 and have upstanding spaced parallel plates 12 attached thereto which are positioned upon opposite sides of the arms 3 and attached thereto in any suitable manner as indicated at 13.

The pins 5' extend through the disks 11, 8, and downwardly through the side rails and the braces 10, as clearly shown in Fig. 2 of the drawings, for pivotally connecting the arms or cross trees 3 to the rails 1 and 2 so that the rails 1 and 2 may be moved toward each other for collapsing the hay rack or frame, as shown in Figs. 5 and 6 of the drawings, when it is desired to place the hay frame upon a wagon running gear or remove it therefrom for storage.

The side boards 15 and 16 of the hay rack are mounted upon the upper surfaces of the outer ends of the cross arms or trees 3 and they are connected to the outermost of the cross trees 3ª through the medium of substantially U-shaped plates 17. The U-shaped plates 17 are attached to the under surfaces of the side boards 15 and 16 near their ends and the bight portions 19 of the U-shaped members 17 rest upon the upper edges of the ends of the outermost of the cross trees while the depending legs or sides of the U-shaped members engage the sides of the cross trees or arms. Removable pins, such as cotter pins or the like as indicated at 21 extend through the sides of the U-shaped members 17 and through the end cross tree 3ª as clearly shown in Fig. 4 of the drawings, for removably connecting the side boards 15 and 16 to the cross trees of the hay rack structure.

When it is desired to store the hay rack, the pins 21 are drawn out of the openings formed in the sides of the substantially U-shaped members 17 and in the ends of the end cross tree 3ª and the side bars are removed leaving the cross trees and the side rails free as shown in Figs. 5 and 6, after which the rails are moved toward each other, for collapsing the frame. Owing to the connection between the rails through the medium of the braces 10 and the cross trees 3, the rails will have a longitudinal movement as well as a lateral movement when forced toward each other, thus causing the cross trees to assume the positions indicated in Figs. 5 and 6 which places the hay rack folded in a compact structure so that it may be easily moved or may be stored in a small space if desired.

In reducing the invention to practice, certain minor features of construction, combination and arrangement of parts may necessitate alterations to which the patentee is entitled provided such alterations are comprehended within the scope of what is claimed.

What is claimed is:—

1. In a hay rack structure, the combination, of rails, a plurality of cross trees, pivotal brackets carried by said cross trees and including substantially horizontally positioned disks, brackets carried by said rails and including substantially horizontally positioned disks, the disks of said tree carried brackets engaging the disks of said rail carrying brackets, and pivot pins extending downwardly through said disks and through said rails for pivotally connecting said trees to said rails.

2. In a hay rack structure, the combination, of rails, a plurality of cross trees, pivotal brackets carried by said cross trees and including substantially horizontally positioned disks, brackets carried by said rails and including substantially horizontally positioned disks, the disks of said tree carried brackets engaging the disks of said rail carrying brackets, pivot pins extending downwardly through said disks and through said rails for pivotally connecting said trees to said rails, and side boards removably mounted upon the upper edges of said trees and detachably connected to the endmost trees of the rack structure.

3. In a hay rack structure, the combination, of rails, a plurality of cross trees, pivotal brackets carried by said cross trees and including substantially horizontally positioned disks, brackets carried by said rails and including substantially horizontally positioned disks, the disks of said tree carried brackets engaging the disks of said rail carrying brackets, pivot pins extending downwardly through said disks and through said rails for pivotally connecting said trees to said rails, and side boards removably mounted upon the upper edges of said trees and detachably connected to the endmost trees of the rack structure, and cross braces pivotally connected to said rails.

4. In a hay rack structure, side rails, a plurality of brackets carried by said side rails and comprising parallel vertical plates, horizontally positioned disks attached to the upper ends of each pair of said plates, cross trees, pivoting brackets carried by said cross trees and comprising a pair of spaced plates attached to the cross trees, horizontally positioned disks attached to the lower edges of said attaching plates, said last named disks rotatably engaging the upper surface of said first named disks, pivot pins extending downwardly through said disks and said rails for pivotally connecting said cross trees to said rails, cross braces, certain of said first named parallel plates having their lower ends bent over the ends of said cross braces, said pins extending through said cross braces and said bent ends for pivotally connecting the cross braces to the rails.

5. In a hay rack structure, side rails, a plurality of brackets carried by said side rails and comprising parallel vertical plates, horizontally positioned disks attached to the upper ends of each pair of said plates, cross trees, pivoting brackets carried by said cross trees and comprising a pair of spaced plates attached to the cross trees, horizontally positioned disks attached to the lower edges of said attaching plates, said last named disks rotatably engaging the upper surface of said first named disks, pivot pins extending downwardly through said disks and said rails for pivotally connecting said cross trees to said rails, cross braces, certain of said first named parallel plates having their lower ends bent over the ends of said cross braces, said pins extending through said cross braces and said bent ends for pivotally connecting the cross braces to the rails, side boards removably mounted upon the upper surfaces of said cross trees, and means for detachably connecting said side boards to the outermost of said cross trees.

In testimony whereof I affix my signature in presence of two witnesses.

JOSEPH LICHY.

Witnesses:
EDWARD FEIO,
S. GIEDRICH.